Aug. 15, 1933.   H. C. GORE ET AL   1,922,730
PROCESS OF PREPARING A WORT
Filed March 11, 1930
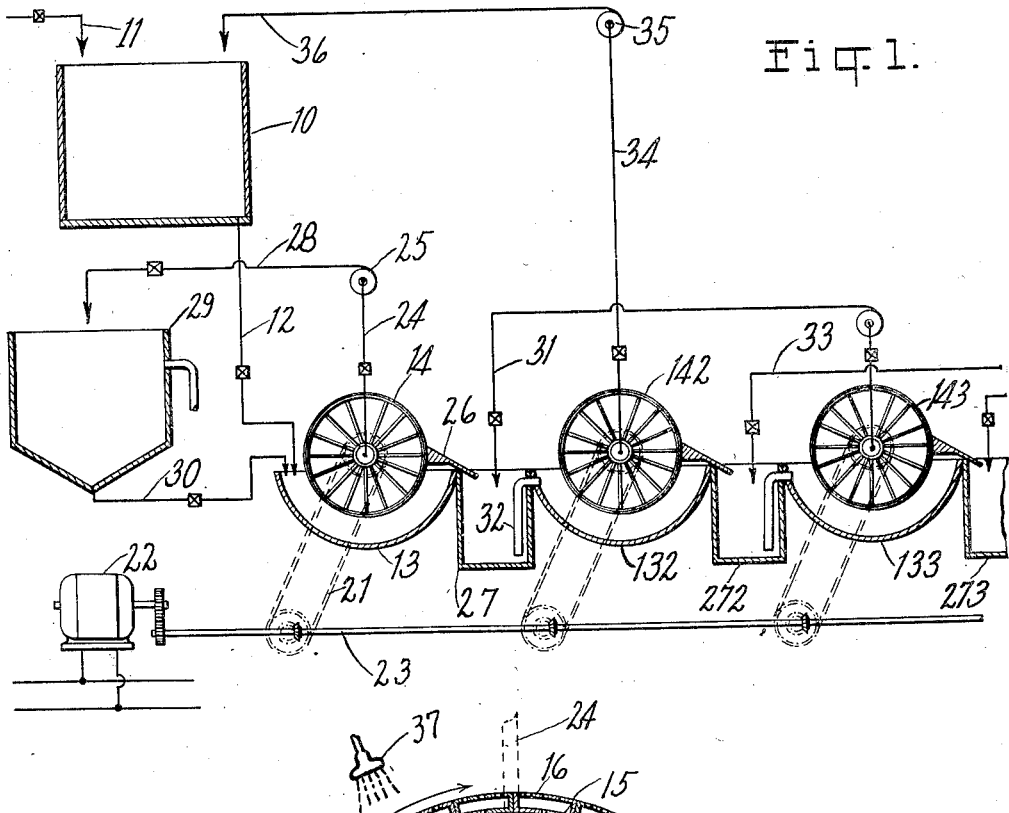
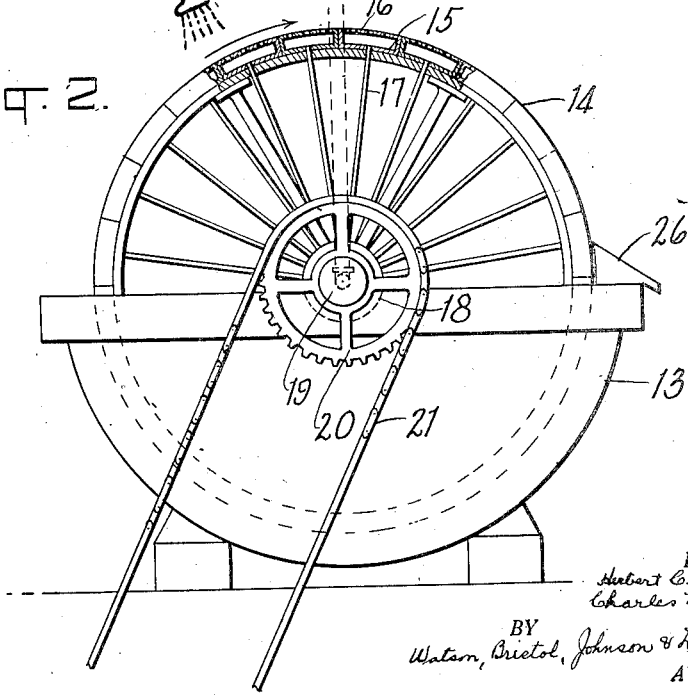
INVENTOR.
Herbert C. Gore
Charles N. Frey
BY Watson, Bristol, Johnson & Leavenworth
ATTORNEYS.

Patented Aug. 15, 1933

1,922,730

UNITED STATES PATENT OFFICE 1,922,730

PROCESS OF PREPARING A WORT

Herbert C. Gore, Scarsdale, and Charles N. Frey, New York, N. Y., assignors to Standard Brands Incorporated, Dover, Del., a Corporation of Delaware Application March 11, 1930. Serial No. 434,975

14 Claims. (Cl. 195—32)

This invention relates to a novel process for the separation by continuous filtration of liquids from solids and slimy insoluble matter suspended therein, with or without concurrent and/or countercurrent washing.

A general object of the invention is to provide a process for the separation by continuous filtration of the liquids from solids and slimy insoluble matter suspended therein, in a rapid, efficient and economical manner.

More specifically, an object of the invention is to provide a process which is especially adapted to separate cereal mashes into wort and thoroughly exhausted and dewatered grains in a continuous manner and preferably in a cycle which may be repeated as often as desired.

A further object of the invention is to provide a process for the separation by continuous filtration of liquids from solids and slimy insoluble matter suspended therein with concurrent and/or counter-current washing, in order to obtain a maximum extraction with minimum dilution of the wort and to obtain the cereal solids in a well dewatered condition.

Other objects of the invention will in part be obvious and will in part appear hereinafter.

The invention accordingly comprises the several steps and the relation and order of one or more of such with respect to each of the others, as exemplified in the following detailed disclosure, and the scope of the application of which will be indicated in the claims.

For a fuller understanding of the nature and objects of the invention, reference should be had to the following detailed description taken in connection with the accompanying drawing, in which:

Fig. 1 is a view illustrating somewhat schematically the steps of the present process, and shows somewhat diagrammatically the nature and arrangement of a novel and preferred form of apparatus for carrying out the process; and Fig. 2 is a view, partly in section and partly in end elevation showing the construction and operation of a filtering device adapted for use in connection with the invention.

Although as indicated above, the novel process comprising the present invention may be used in a variety of industries and instances in which there is a necessity for the rapid and efficient separation and recovery of liquids from solids and slimy insoluble matter suspended therein and vice versa, nevertheless for purposes of simplicity the following specific disclosure will be limited to an explanation of the invention in the separation of worts from cereal solids in cereal mashes, and it is to be understood that since certain changes in carrying out the process and in the construction set forth may be made without departing from the scope and spirit of the invention, it is intended that all matter contained in the description, or shown in the accompanying drawing shall be interpreted as illustrative and not in a limiting sense.

Heretofore, in the brewing and distilling industries, the process in general use for producing wort and feed from mash, employed malt that was rather coarsely ground and mashed, with or without the admixture of other farinaceous materials. The mash was either made in a filter tub or put into a filter tub after mashing for separation of the wort from the draff, and the wort was then drawn off through the layer of ground cereal material which settles into the perforated false bottom of the filter tub; the first turbid runnings being usually returned. When drainage was nearly complete, either hot spargings from a previous mash or hot water, was sprayed onto the upper surface of the layer of partly exhausted draff and the drainage was continued. Usually also stirring of the grains by the mixer with which such filter tubs are provided was practiced while the sparging liquid was added, and the resulting wash waters comprising a dilute wort were drained off as in the first drainage operation.

In order to get proper extraction relatively large amounts of sparging water were necessary and consequently considerable dilution of the wort occurred during this process, while the exhausted grains were left in a wet condition in the bottom of the filter tub, with the result that when the wort was to be further concentrated or the draff was to be dried, the dilution of the wort and the wet condition of the grains presented serious disadvantages.

There are also other objections to the heretofore known processes: For example, a rather coarse grinding of the cereals is required in order that the bed at the bottom of the filter tub may possess a sufficiently open structure to permit effective drainage, frequently resulted in a comparatively low yield of extract, particularly when using malt that has not been adequately modified in the malting process. Moreover in such processes the rate of draining is variable, depending on a number of factors, including not only the malt quality but the method of grinding the depth of fill in the filter tub, and the general composition and heat treatment of the mash. Such mashes are also perishable, consisting as they do of readily fermentable ingredients that tend to spoil during the relatively long period required for draining.

Such disadvantages have led to attempts to substitute other processes for the separation of wort and exhausted grains in mash. For example, the use of filter presses of the plate and frame type has been proposed. Such processes however have not been commercial, because the filter cloths soon become so clogged that filtration becomes slowed to an impractical extent. In other words, the suspended slimy insoluble matter in the mash (consisting largely of protein substances which normally are well distributed through the mash) undergoes segregation in the filter press as the filtration rate becomes increasingly slow, and a large proportion of it passes through the cake on the filter and collects at the filter cloth surfaces, thus increasing the rate of clogging. The remainder of the cake remains relatively free draining and does not form a well de-watered cake, and due to the clogging effective washing or sparging is impracticable.

By the process of the present invention, these shortcomings are substantially avoided. In a simple form of the present process, small portions of the solid material are spread out in thin layers and quickly compacted, whereby entrapping the slimy matter so suddenly that it remains distributed among the coarser particles of the mash and does not in consequence act so as materially to impede filtration. To facilitate this, the malt may be ground much more finely than when prepared for use in a filter tub. It is preferred to grind it sufficiently fine, that only from about five to about fifteen percent will remain on a 60-mesh seive. This finer grinding gives the solid particles of the converted mash greater binding or felting power so that they form a firm, compact mass which holds the finely divided slimy matter well entrapped while the mash is being rapidly filtered therethrough. This fine grinding further adapts the mash to hold well to the filter surfaces of the revolving drum type of suction filters hereinafter described, forming a compact filter cake that is readily de-watered, and, of course, hastens the mashing operations and increases the extract obtained from a given amount of materials.

In order to facilitate the practice of the present invention, especially where continuous filtration is to be employed, it is desirable to use a filter surface of perforated sheet metal, rather than filter surface of cloth, or even a filter surface of woven wire, as a cloth surface generally becomes clogged in time due to the fine, slimy particles of the mash becoming imbedded in its fibres. This clogging effect exists, although to a lesser extent where fine woven wire is substituted. Finely perforated sheet metal, however, substantially avoids all clogging and provides a satisfactory filter surface, upon which forms a uniform and efficient filter cake, which may be readily and completely removed therefrom.

In the carrying out of the present invention commercially, continuous filtration is practiced. Any one of several forms of continuously operating filters may be employed. While suction filters are preferred, it is possible to use pressure filters or pressure and suction filters combined, where designed to effect the successive formation and removal of filter cakes desired in the practice of the invention. Continuously rotated drum type suction filters, such as are now obtainable on the open market and sold under various trade names, for example, under the trade name "Oliver", are particularly adapted for the practice of the present process. In such filters, the drum structure comprises a plurality of adjacent sections arranged with applied suction throughout the greater portion of their peripheral travel, and to pass successively through the material to be filtered as the drum is rotated. Each section is provided with a reticulated outer filter surface.

In order more particularly to adapt such filters to the practice of the present invention in the manner above indicated, their filter surfaces are constructed of perforated plates formed of a suitable sheet metal, for example, of sheet brass or sheet copper of the type used in sugar centrifuges. These plates may be secured in place on the drum-sections by any suitable means, but it is preferable in a manner such as to present a relatively smooth and free filtering peripheral surface which may be scraped clean at each revolution of the filter drum.

In order readily to separate a mash into wort and exhausted grain, a trough is provided under the suction drum of a filter and supplied with mash fed in such a manner from a supply tank as to keep the mash at a desired level, while the suction drum is rotated at a speed which is found well adapted to the process and a particular mash, for example, at a speed of from ½ revolution to several revolutions per minute. As the sections of which the rotating drum is composed pass successively through the mash, suction is applied for the time desired by suitably adjusting the automatic valve of the filter. A filter cake is thereby formed in the suction surface, and is withdrawn from the mash while suction is being continuously applied. It is preferred that the suction shall be applied not only while the section is passing through the mash but also for the most of its upper peripheral travel so that the filter cake in consequence becomes fully de-watered by the continued application of suction. It may be washed if desired by sprays of dilute wort or water as hereinafter described, and is finally removed by the scraper with which such filter is preferably provided. The filtrate and washings may be removed together or collected separately. The filter cake thus resulting is by comparison substantially always more free from water than brewers grains obtained by the filter tub process.

The filtrate resulting from the present process is usually slightly turbid, due to the presence in it of a small quantity of insoluble protein bearing material and a small proportion of short fibrous material derived from the hulls and other fibrous tissues of the mash ingredients. If, however, the filtrate is to be used in processes where further quantities of protein bearing material are separated from the mash as by the boiling, no further clarification may be needed. If, on the other hand, a clear filtered wort is to be employed, this may be had simply by adding a little filter aid, such as kieselguhr and then filtering through cloth in a filter of any standard type, since at the conclusion of the mashing process a sound mash is normally free filtering. It has also been found to be practical in the practice of the present process to separate the small amount of sediment remaining in the filtrate by a continuous decantation process, returning the sludge to the mash.

In order to practice the present invention in connection with counter-current washing, the separation of wort and exhausted grain is accomplished in several successive steps, the wort being returned and the exhausted grains distributed in such a manner that relatively complete separation is effected with substantially a minimum dilution of the wort, the exhausted grains being finally discharged in a well de-watered condition. To this end, a mash tank is associated with two or more filters arranged to discharge successively the one into the other. In a preferred arrangement, three filters, which have revolving drums fitted with suction surfaces of perforated sheet metal, are employed. In such an arrangement, each filter is provided with suction means of any suitable form adapted to lift water. Each filter has also associated therewith one or more mixing tanks adapted to receive the filter cake.

An arrangement of apparatus adapted for carrying out the process of the present invention in the manner last described, is shown in Fig. 1 of the drawing, in which 10 denotes a mashing tank in which a hot mash is made, using relatively finely ground malt with or without other cereal material. Mash water may be initially introduced into the tank from any convenient source, for example from the tap shown at 11. While but one mashing tank is shown in the drawing, it will be understood that several tanks may be used in practice, the number depending upon the procedure adapted for the mashing step. The hot mash thus prepared is run through the supply main 12 to the vat or trough 13 of the first filter here indicated as having a revolving drum 14. The supply of mash in the trough 13 is kept substantially at a constant level by any suitable means, for example, a float valve, not shown in the interest of clearness.

The drum 14 as shown in Fig. 2 comprises a plurality of rectangular sectional vessels 15 disposed side by side to form the outer surface of the drum. These vessels have an outer filter surface 16 of perforated sheet metal plates as described above, secured in place and spaced from the inner wall of the vessels. Each section has one or more pipes 17 communicating therewith and leading to a central hub portion 18 that turns with the drum; this hub portion being journaled on an inner cylinder 19 that has portions of its side cut away to provide valved openings on its under part affording controlled communication with the pipes 17, whereby suction is applied when the drum rotates through the mash, and for a portion of the upper peripheral travel. The hub 18 is caused to rotate by any suitable means, for example, by means of the driving sprocket 20 secured thereon to which driving force is transmitted by means of the sprocket chain 21, the sprocket chain being driven by a suitable prime mover, for example, the motor 22 and its connected shafting 23. The stationary cylinder 19 has a suction pipe 24 communicating therewith, the suction being produced by suitable means, such as the centrifugal pump shown at 25.

If now the suction drum 14 be made to revolve in the supply vat 13 when properly filled with mash, filter cakes are caused to form on each of the plates 16 as suction is applied thereto; the amount and duration of this suction being regulated by the valves of the filter. As the drum revolves in the mash, a series of filter cakes is withdrawn in the form of a more or less continuous sheet, which at first may be in the neighborhood of one-half inch in thickness. This thickness, however, is dependent upon the strength of the vacuum, such cake gradually becoming thinner as it is compacted under the suction action. The drum may be revolved in either direction; it is preferable, however, to have the filter cake remain on the drum surface sufficiently long to become properly de-watered. In Fig. 2, the direction of rotation is indicated as clockwise by an arrow and, as shown, the cake may be washed on the upper traverse by means of a water spray 37. As the filter cakes thus formed approach the other side of the drum, steps are taken to remove same. This may be readily effected by means of the scraper shown at 26. The drum thus scraped is substantially clean, so that the cycle of operations may be repeated continuously.

The filter cake when scraped from the drum of the filter machine, is made to pass into a washing or puddling tank 27 which is disposed adajacent to the vat or trough 13. The wort withdrawn by the pump 25 is conveyed away by a conduit 28 to any convenient point. Where it is desired to remove any sediment remaining in the filtrate, the wort withdrawn is run into a clarifying vat 29 which preferably has a sludge return passage 30 arranged to discharge into the supply vat 13.

To illustrate the application of counter-current washing to the separation of mash into wort and exhausted grains by the process of the present invention, three filters are shown arranged to operate successively on the cereal material. To this end, the filter cake discharged into the puddling tank 27 is arranged to be mixed with diluted wort supplied through a connection 31 leading from the third filter in the series. When properly mixed, the cereal material in the puddling tank 27 is supplied to the vat or trough 132 under the second filter drum 142. This transfer may be effected in any convenient manner, for example, through the pipe connection shown at 32. Here the cereal material is again separated into a filtrate and filter cake in the manner above described; the filter cake being discharged into a second puddling tank 272 in which it is this time washed and mixed with water supplied through a conduit 33. The filtrate from the second filter is withdrawn through a conduit 34 by means of a pump 35 and is preferably employed in continuous production of mash in the mash tank 10, instead of the mash water initially supplied. To this end, a conduit 36 is shown as leading from the pump 35 arranged to discharge into the tank 10. The cereal material in the puddling tank 272 when properly mixed is again passed over into the supply vat or trough 133 of a third filter machine having a revolving drum 143. Here, it is once more separated into a filtrate and filter cake that is discharged into a third puddling tank 273; the filtrate in this case being used to dilute the filter cake in the first puddling tank 27, as above described. By proceeding in this manner, it can readily be seen that the separation of the mash into wort and filter cake is substantially complete when it has passed through the last machine; although it will be obvious that the successive treatment of filter cakes in this manner, is by no means limited to the use of three machines.

In the practice of the present invention, the relative yield of dry extract compared with the grain used, is comparatively high, and may be as high for example, as sixty-eight percent. The ratio of water used to the cereal material employed is not high and may be for example, three to one. The ratio of the weights of extract respectively in the wort and in the filter cake which leave the first filter in the series, may be approximately three to one; while the ratio of the extract in the filtrate and in filter cake may be as much as four to one, for both the second and third filters in the series.

Thus, by the present invention a process is provided which effects the continuous separation of mash into wort and exhausted grains in a relatively small amount of time in a manner giving high percentage yields with relatively little liability of spoilage.

Having described our invention, what we claim as new and desire to secure by Letters Patent is:

1. The process of obtaining a wort separated from draff which comprises preparing a mash of relatively finely ground cereal material, dividing the draff into relatively thin layers, and applying suction quickly to compact the same and to entrap slimy matter in distributed condition through coarser particles of the mash while withdrawing wort.

2. The process of obtaining a wort separated from draff which comprises preparing a mash of relatively finely ground cereal material, dividing the draff into relatively thin layers, and applying suction quickly to compact the same and to entrap slimy matter in distributed condition through coarser particles of the mash while removing the wort therefrom.

3. The process of obtaining a wort separated from draff which comprises preparing a mash of relatively finely ground cereal material, forming and withdrawing a thin layer of mash upon a filter surface, and applying suction to said layer quickly to compact the same and to entrap slimy matter in distributed condition through coarser particles of the mash and withdraw wort simultaneously.

4. The process of obtaining a wort separated from draff which comprises preparing a mash of relatively finely ground cereal material, forming and withdrawing thin layers of draff upon a filter surface, and applying suction to said layers to compact the same and to entrap slimy matter in distributed condition through coarser particles of the mash and withdraw wort simultaneously.

5. The process of obtaining a wort separated from draff which comprises preparing a mash of relatively finely ground cereal material, forming and withdrawing thin layers of draff upon a filter surface, applying suction to said layers to compact the same and to entrap slimy matter in distributed condition through coarser particles of the mash and to withdraw wort simultaneously, thereafter washing said draff while continuing the application of suction, and then removing the draff from the filter surface.

6. The process of obtaining a wort separated from draff which comprises preparing a mash of relatively finely ground cereal material, dividing the mash into relatively thin layers, collecting and applying suction to said layers to compact the same and to entrap slimy matter in distributed condition through coarser particles of the mash while withdrawing wort, and thereafter removing sludge from the wort.

7. The process of obtaining a wort separated from draff which comprises preparing a mash of relatively finely ground cereal material, successively removing relatively thin layers of draff from the mash, and applying suction through a perforated sheet filter surface to said layers in order quickly to compact the same into cakes upon said perforated sheet-filter-surface, while removing the wort therefrom.

8. The process of obtaining a wort separated from draff which comprises preparing a mash of relatively finely ground cereal material, successively removing relatively thin layers of draff from the mash upon a perforated sheet-filter-surface, and applying suction simultaneously to compact said layers into cakes to entrap slimy matter in distributed condition through coarser particles of the mash and to withdraw wort.

9. The process of obtaining a wort separated from draff which comprises preparing a mash of relatively finely ground cereal material, successively removing relatively thin layers of draff from the mash upon a perforated sheet-filter surface, applying suction simultaneously to compact said layers into cakes to entrap slimy matter in distributed condition through coarser particles of the mash and to withdraw wort thereafter washing said draff while continuing the application of suction, and then removing the draff from the filter surface.

10. The process of removing liquids from solids and slimy insoluble matter suspended therein comprising removing relatively thin layers of solids from the liquids by passing a succession of sheet-filter surfaces through said liquid, applying suction successively to compact said layers into cakes to entrap slimy matter in distributed condition through coarser particles of the mash while withdrawing the liquid, mixing said cakes with a liquid and repeating the separation.

11. The process of obtaining a wort separated from draff which comprises preparing a mash of relatively finely ground cereal material, successively removing relatively thin layers of draff from the mash by passing a succession of sheet-filter surfaces through said mash, applying suction simultaneously to compact said layers into cakes to entrap slimy matter in distributed condition through coarser particles of the mash and to withdraw wort thereafter washing said draff while continuing the application of suction and then removing the draff from the filter surface.

12. The process of obtaining a wort separated from draff which comprises preparing a mash of relatively finely ground cereal material, successively removing relatively thin layers of draff from the mash by passing a succession of sheet-filter surfaces through said mash, applying suction successively to compact said layers into cakes to entrap slimy matter in distributed condition through coarser particles of the mash while withdrawing the liquid and repeating the separation.

13. The process of obtaining a wort separated from draff which comprises preparing a mash of cereal material which has been ground to a fineness such that from about 5% to 15% thereof only will remain on a 60-mesh sieve, filtering the mash with a drum type rotating filter having filtering surfaces formed of finely perforated sheet metal under such conditions as to entrap slimy matter in distributed condition through coarser particles of the mash, withdrawing the wort removed by suction, and removing the draff from the filter surfaces.

14. The process of obtaining a wort separated from draff which comprises preparing a mash of cereal material which has been ground to a fineness such that from about 5% to 15% thereof only will remain on a 60-mesh sieve, filtering the mash with a drum type rotating filter having filtering surfaces formed of finely perforated sheet metal under such conditions as to entrap slimy matter in distributed condition through coarser particles of the mash, withdrawing the wort removed by suction, removing the draff from the filter surfaces, mixing said draff with a liquid, and repeating the separation.

HERBERT C. GORE.
CHARLES N. FREY.